(12) United States Patent
Balsells

(10) Patent No.: US 7,055,812 B2
(45) Date of Patent: Jun. 6, 2006

(54) CANTED COIL SPRINGS VARIOUS DESIGNS

(75) Inventor: Peter J. Balsells, Newport Beach, CA (US)

(73) Assignee: Bal Seal Engineering Co., Inc., Lake Forest, CA (US)

( * ) Notice: Subject to any disclaimer, the term of this patent is extended or adjusted under 35 U.S.C. 154(b) by 0 days.

(21) Appl. No.: 10/673,950

(22) Filed: Sep. 29, 2003

(65) Prior Publication Data
US 2004/0070128 A1    Apr. 15, 2004

Related U.S. Application Data

(60) Provisional application No. 60/415,244, filed on Sep. 30, 2002.

(51) Int. Cl.
F16F 1/06 (2006.01)

(52) U.S. Cl. .................. 267/167; 267/166

(58) Field of Classification Search ........ 267/166, 267/166.1, 167, 168, 1.5
See application file for complete search history.

(56) References Cited

U.S. PATENT DOCUMENTS

| 2,991,064 | A | * | 7/1961 | De Jean | 267/167 |
| 3,011,775 | A | * | 12/1961 | MacLeod | 267/167 |
| 4,632,496 | A | * | 12/1986 | Williams | 439/841 |
| 4,655,462 | A | | 4/1987 | Balsells | |
| 4,826,144 | A | | 5/1989 | Balsells | |
| 4,830,344 | A | | 5/1989 | Balsells | |
| 4,876,781 | A | | 10/1989 | Balsells | |
| 4,893,795 | A | | 1/1990 | Balsells | |
| 4,907,788 | A | * | 3/1990 | Balsells | 267/168 |
| 4,915,366 | A | | 4/1990 | Balsells | |
| 4,961,253 | A | | 10/1990 | Balsells | |
| 4,964,204 | A | | 10/1990 | Balsells | |
| 4,974,821 | A | | 12/1990 | Balsells | |
| 5,108,078 | A | | 4/1992 | Balsells | |
| 5,139,243 | A | | 8/1992 | Balsells | |
| 5,139,276 | A | * | 8/1992 | Balsells | 267/1.5 |
| 5,160,122 | A | | 11/1992 | Balsells | |
| 5,203,849 | A | | 4/1993 | Balsells | |
| 5,239,737 | A | | 8/1993 | Balsells | |
| 5,503,375 | A | | 4/1996 | Balsells | |
| 5,615,870 | A | | 4/1997 | Balsells | |
| 5,709,371 | A | | 1/1998 | Balsells | |
| 5,791,638 | A | * | 8/1998 | Balsells | 267/167 |
| 6,122,862 | A | * | 9/2000 | Hormann | 49/197 |
| 6,193,225 | B1 | * | 2/2001 | Watanabe | 267/180 |
| 6,220,586 | B1 | * | 4/2001 | Pavlin et al. | 267/155 |
| 6,481,701 | B1 | * | 11/2002 | Kessen et al. | 267/166 |

* cited by examiner

Primary Examiner—Christopher P. Schwartz
(74) Attorney, Agent, or Firm—Walter A. Hackler

(57) ABSTRACT

A coil spring includes a plurality of primary wire coils and a plurality of secondary wire coils, the primary and secondary coils being contiguous and differentiated from one another by a dimensional size in order to provide variable force and variable deflection.

32 Claims, 9 Drawing Sheets

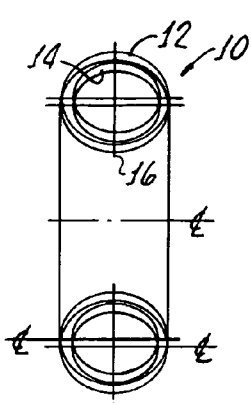
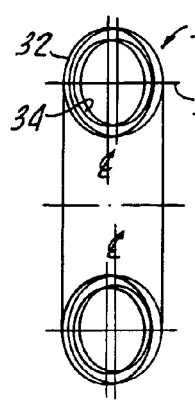
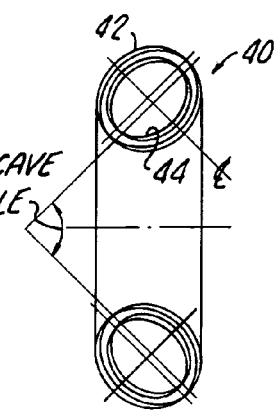
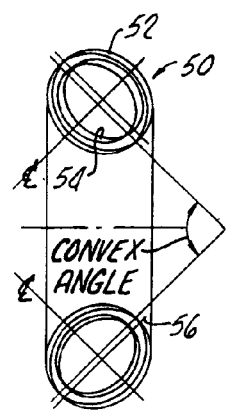
FIG. 1A.  FIG. 1B.  FIG. 1C.  FIG. 1D.
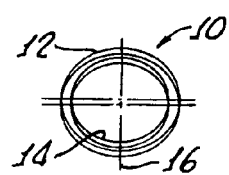
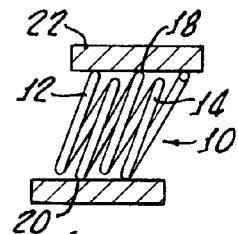
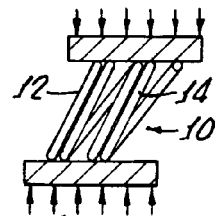
FIG. 1E.  FIG. 1F.  FIG. 1G.
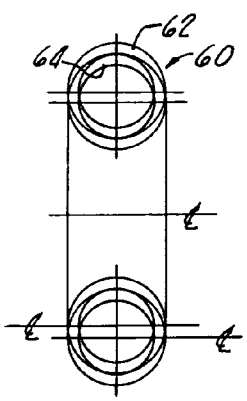
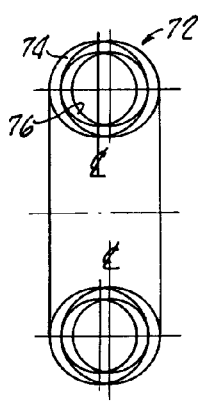
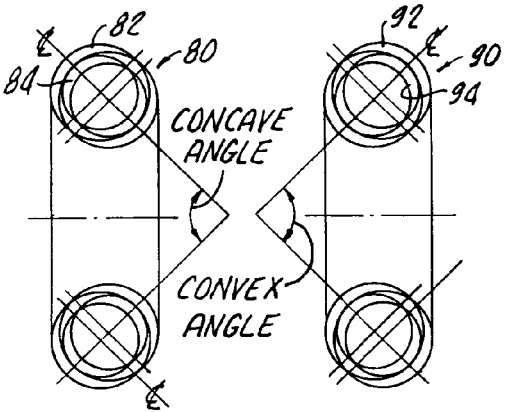
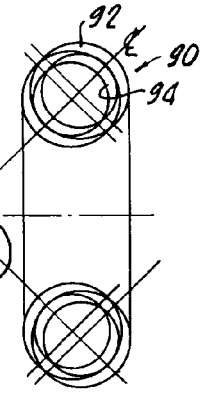
FIG. 2A.  FIG. 2B.  FIG. 2C.  FIG. 2D.
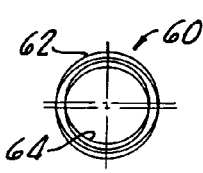
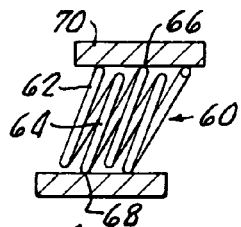
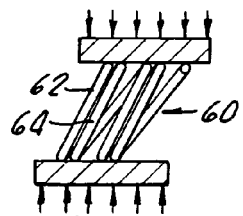
FIG. 2E.  FIG. 2F.  FIG. 2G.

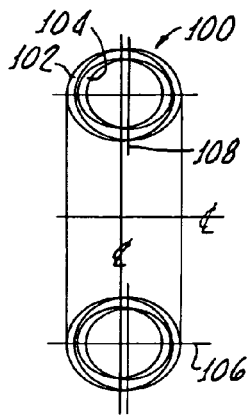 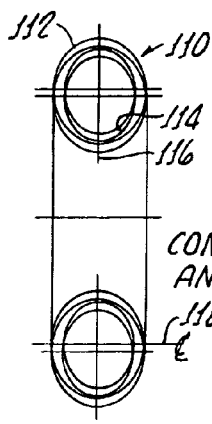 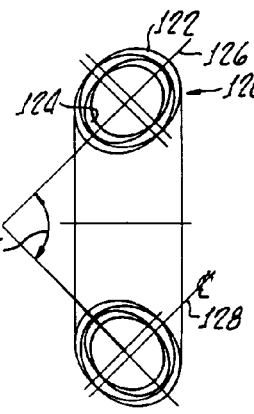 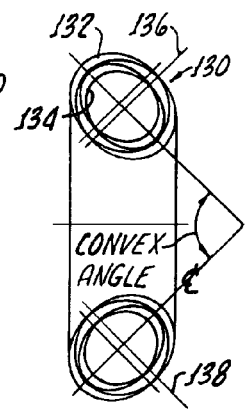
FIG. 3A.  FIG. 3B.  FIG. 3C.  FIG. 3D.
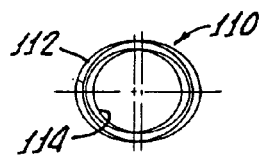 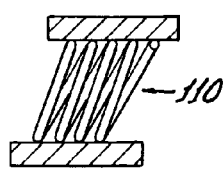 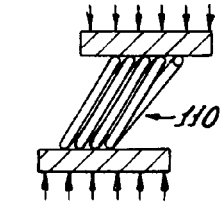
FIG. 3E.  FIG. 3F.  FIG. 3G.
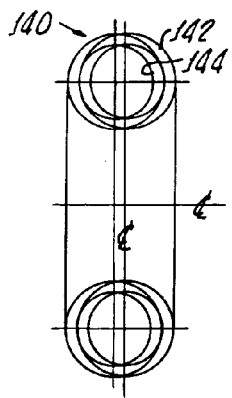 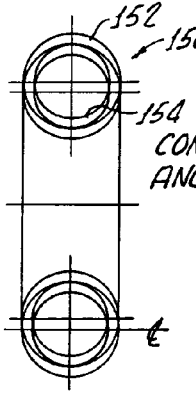 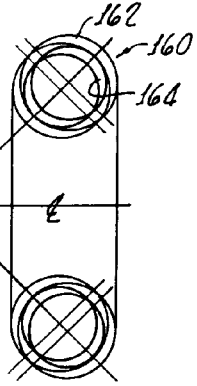 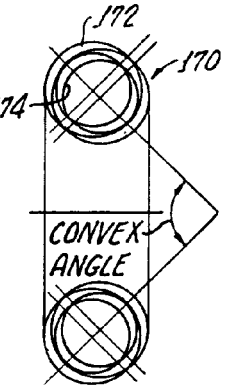
FIG. 4A.  FIG. 4B.  FIG. 4C.  FIG. 4D.
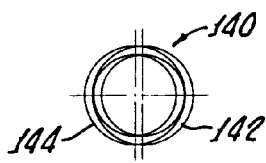 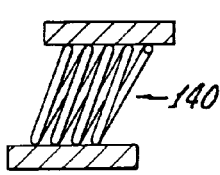 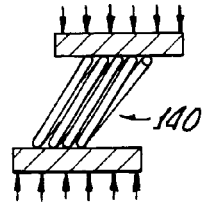
FIG. 4E.  FIG. 4F.  FIG. 4G.

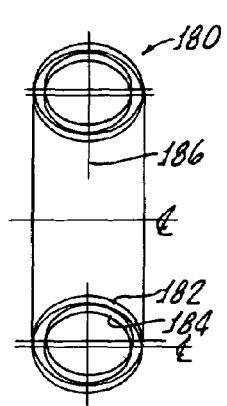 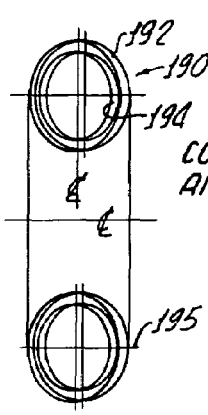 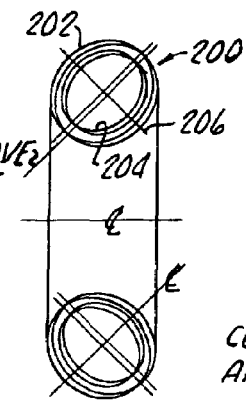 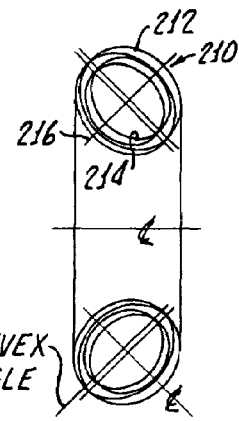
FIG. 5A.   FIG. 5B.   FIG. 5C.   FIG. 5D.
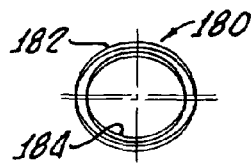 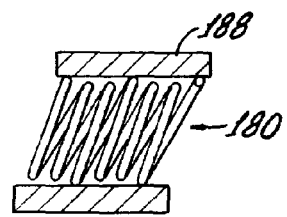 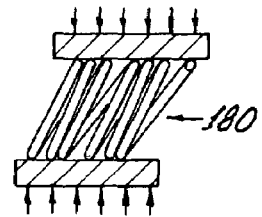
FIG. 5E.   FIG. 5F.   FIG. 5G.
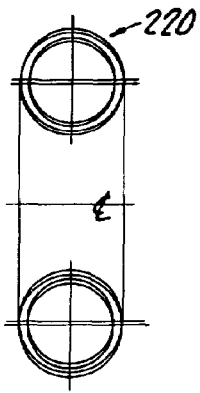 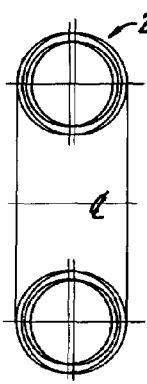 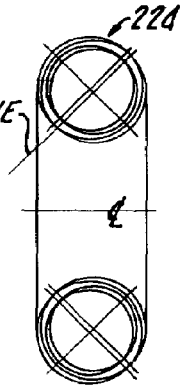 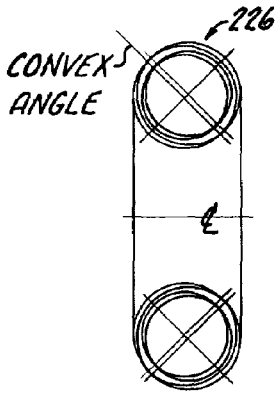
FIG. 6A.   FIG. 6B.   FIG. 6C.   FIG. 6D.
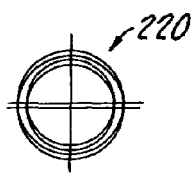 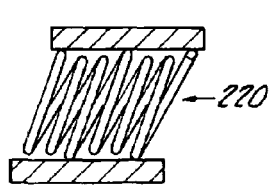 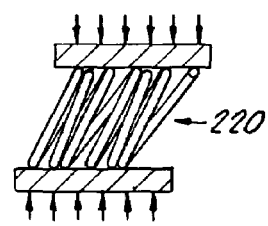
FIG. 6E.   FIG. 6F.   FIG. 6G.

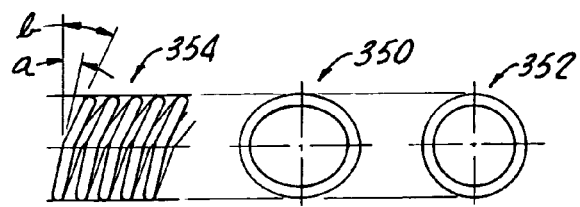 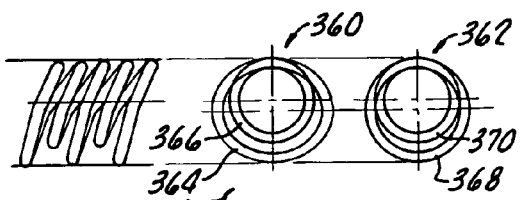
FIG. 8A.    FIG. 8B.
 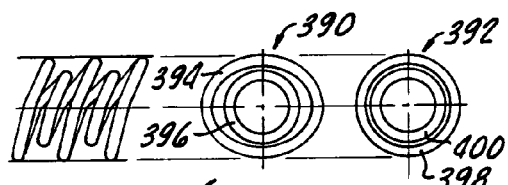
FIG. 8C.    FIG. 8D.
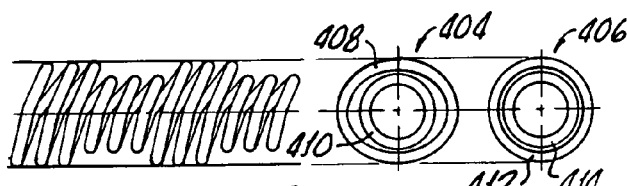 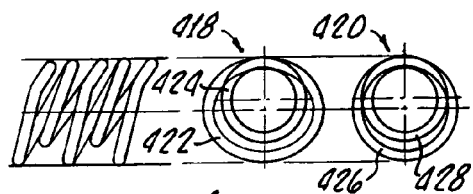
FIG. 8E.    FIG. 8F.
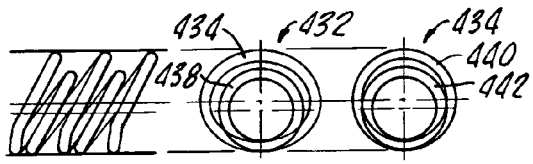 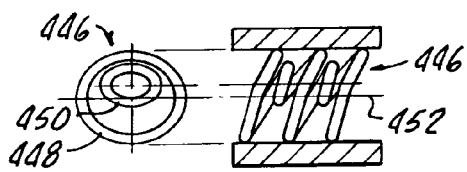
FIG. 8G.    FIG. 8H.
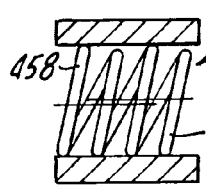 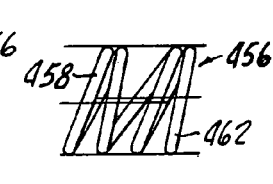 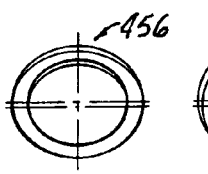 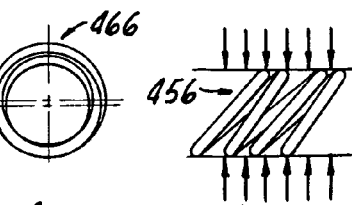
FIG. 9A.  FIG. 9B.  FIG. 9C.  FIG. 9D.  FIG. 9E.
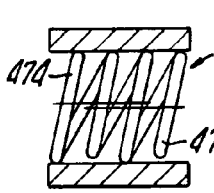 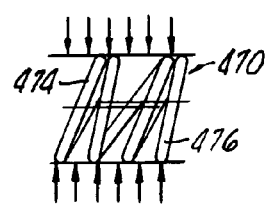 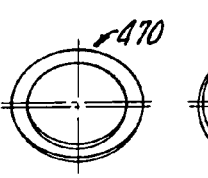 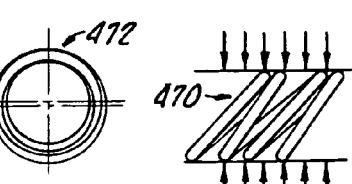
FIG. 10A.  FIG. 10B.  FIG. 10C.  FIG. 10D.  FIG. 10E.

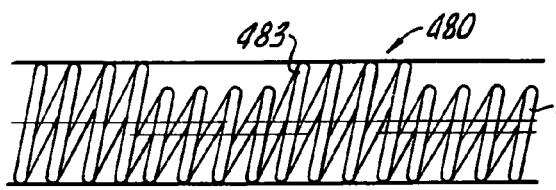
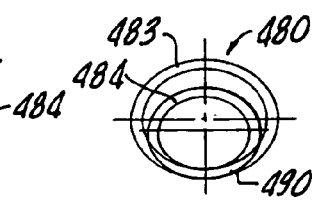
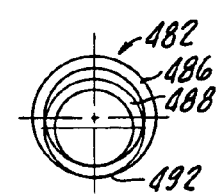
FIG. 11A.  FIG. 11B.  FIG. 11C.
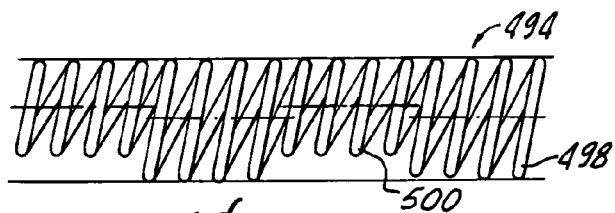
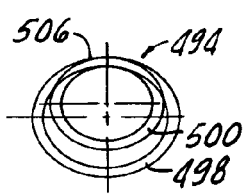
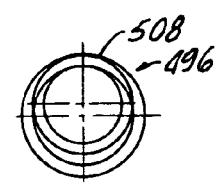
FIG. 11D.  FIG. 11E.  FIG. 11F.
FIG. 11G.
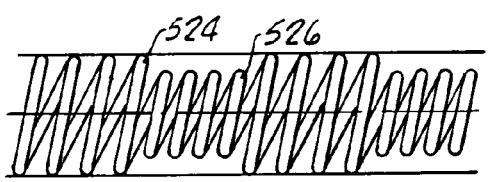
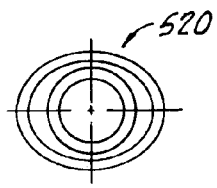
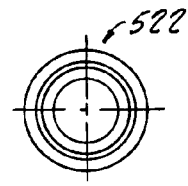
FIG. 11H.  FIG. 11I.  FIG. 11J.
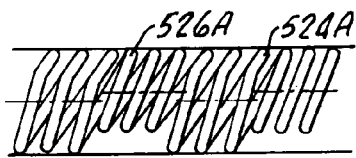
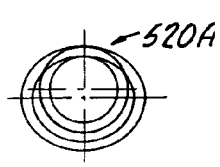
FIG. 11K.  FIG. 11L.  FIG. 11M.
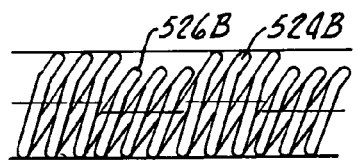
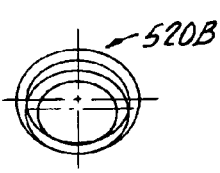
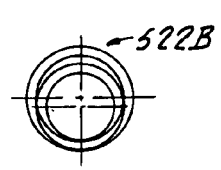
FIG. 11N.  FIG. 11O.  FIG. 11P.

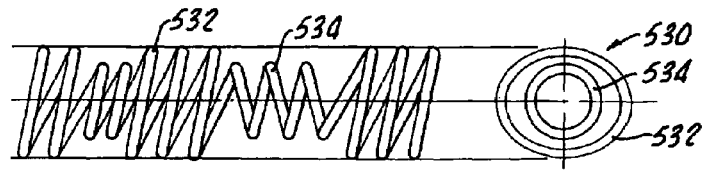
_Fig. 11Q._
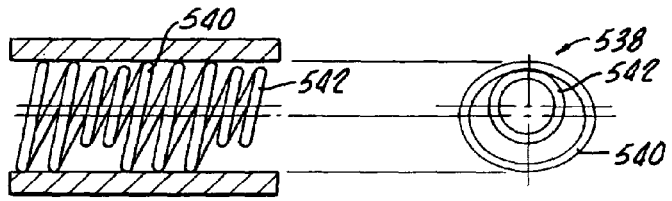
_Fig. 11R._
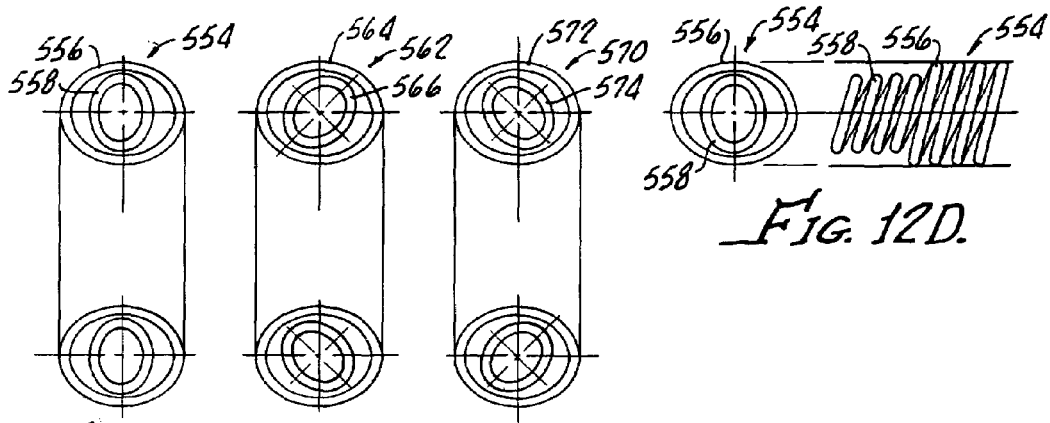
_Fig. 12A._ _Fig. 12B._ _Fig. 12C._ _Fig. 12D._
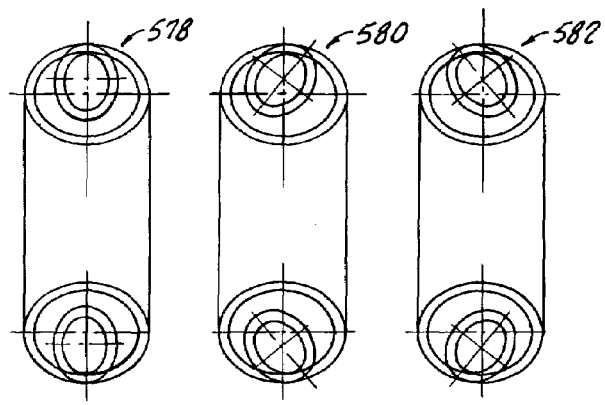
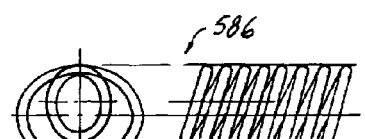
_Fig. 13D._
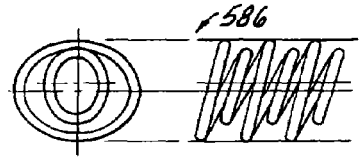
_Fig. 13A._ _Fig. 13B._ _Fig. 13C._ _Fig. 13E._

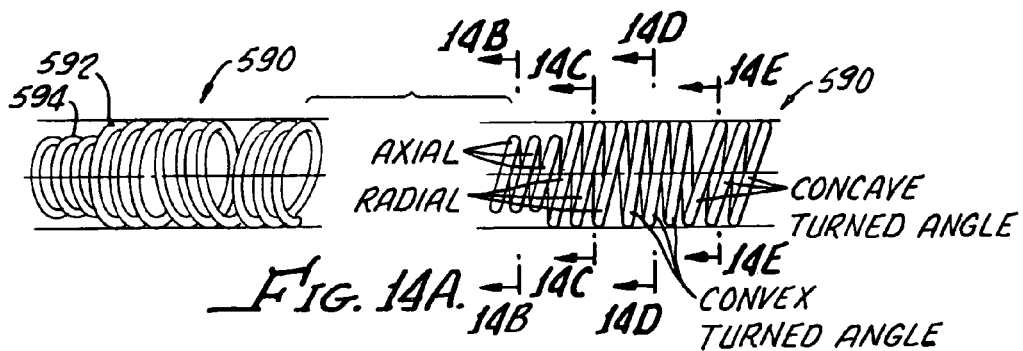
FIG. 14A. FIG. 14B. FIG. 14C. FIG. 14D. FIG. 14E.
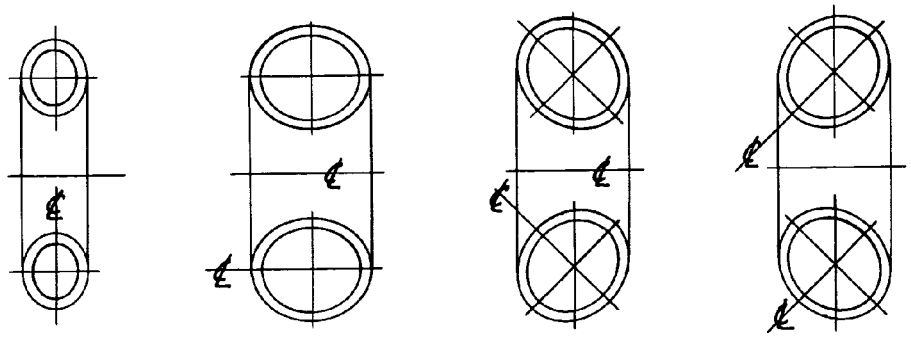
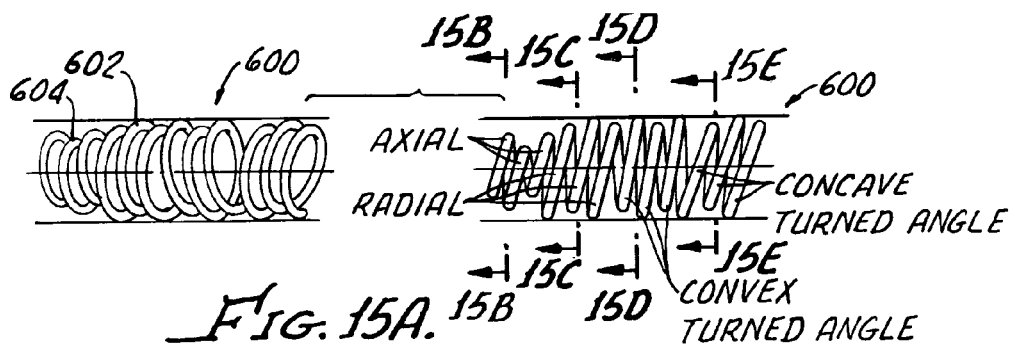
FIG. 15A. FIG. 15B. FIG. 15C. FIG. 15D. FIG. 15E.
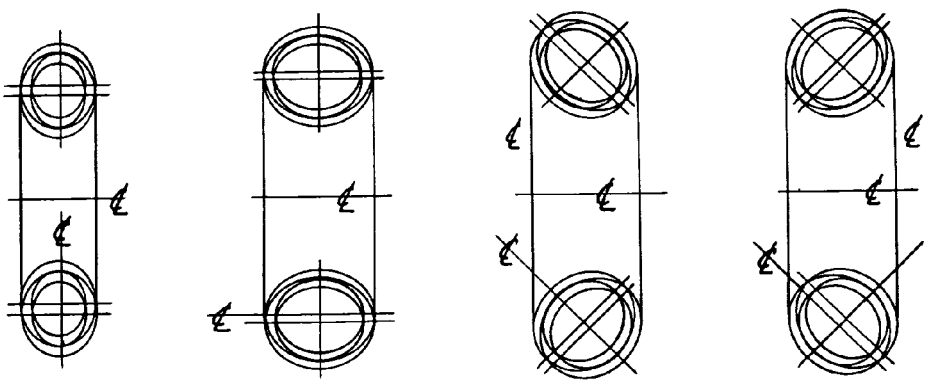

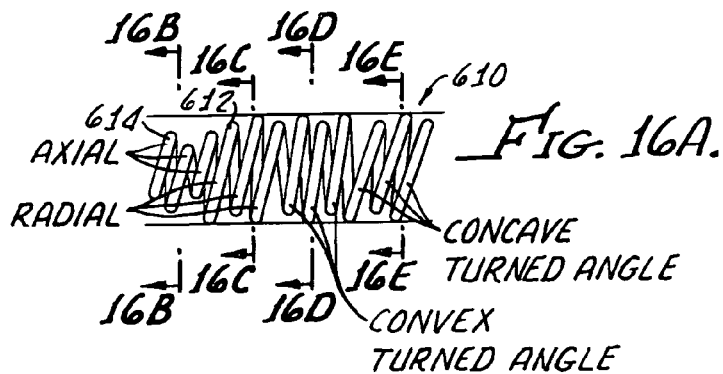
FIG. 16A.
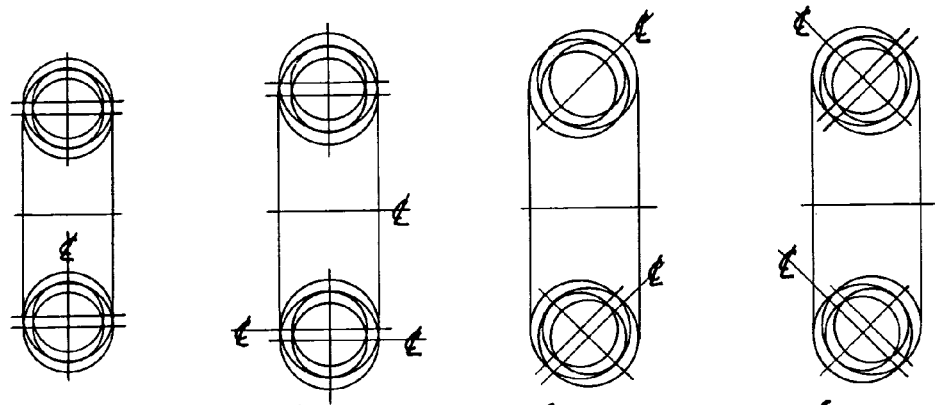
FIG. 16B.  FIG. 16C.  FIG. 16D.  FIG. 16E.
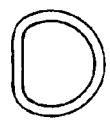  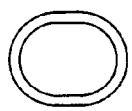  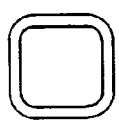
FIG. 17A.  FIG. 17B.  FIG. 17C.
  
FIG. 17D.  FIG. 17E
    RADIAL "V" TYPE SPRING WITH CANTING COILS
FIG. 18.

CANTED COIL SPRINGS VARIOUS DESIGNS

This application claims the benefit of Provisional Application No. 60/415,244, filed Sep. 30, 2002.

The present invention generally relates to canted-coil springs and more particularly, relates to canted-coil springs of various designs.

A general discussion of these types of canted-coil garter-type springs and further advancement in spring design is set forth in U.S. Pat. Nos. 4,655,462; 4,826,144; 4,830,344; 4,893,795; 4,876,781; 4,907,788; 4,915,366; 4,961,253; 4,974,821; 4,964,204; 5,160,122; 5,108,078; 5,139,243; 5,139,276; 5,203,849; 5,239,737; 5,503,375; 5,615,870; 5,709,371; 5,791,638 to Balsells. All these patents are to be incorporated herein by their specific reference thereto for the purpose of disclosing heretofore coil spring design and manufacture.

The force-deflection characteristics of heretofore-available garter-type axial springs have been varied by changing numerous spring parameters, including the wire size, the coil height, the coil spacing, and the front and back angles. While these parameters can be used effectively to tailor the load-deflection characteristics of the spring, they do not dominate or enable the spring to achieve its total design potential.

A heretofore-unrecognized parameter substantially affecting the performance of garter-type axial loaded springs, is set forth in U.S. Pat. Nos. 4,826,144 and 4,915,366. These references disclose coils which are interconnected in a manner forming a garter-type resilient coil spring, with the trailing portion along an outside diameter of the garter-type axially resilient coil spring, and the leading portion along an inside diameter of the garter-type axially resilient coil spring and vice-versa.

The selected disposition of the back angle and trailing portions defined thereby provides for the capability of tailoring a garter-type axially resilient coil spring beyond the range of conventional garter-type resilient coil springs heretofore known.

As a consequence, springs may be formulated with higher load-deflection characteristics. That is, the spring is able to exert a greater force in response to a given deflection than a spring having the same dimensions and wire size with a trailing portion along the inside diameter of the spring.

As a result, these springs can be fabricated from smaller wire and have a closer coil spacing, while still exerting the same force in response to deflection as prior art springs.

The present invention is related to the discovery of other parameters which can be utilized to design garter-type springs having selected load-deflection characteristics.

A spring, in accordance with the present invention, provides operational load-deflection characteristics which may be used to advantage in the design of springs for applications heretofore not possible.

SUMMARY OF THE INVENTION

A coil spring in accordance with the present invention generally includes a plurality of primary wire coils and a plurality of secondary wire coils. The primary and secondary wire coils are contiguous and differentiated by a dimensional size in order to provide variable force and variable deflection.

In addition, the primary and secondary coils may also be disposed in an eccentric manner about the spring centerline in order to tailor the variable force and variable deflection provided by the coils. Various combinations of coil types may also be utilized as hereinafter discussed.

In various embodiments of the present invention, the secondary coils may have a smaller diameter than the diameter of the primary coils and the primary and the secondary coils may be either concentric or eccentric.

Further, the coils may be canted and have various cross-sections, such as elliptical, round, rectangular, square, triangular or "D" shaped.

In addition, the primary and secondary coils may have differing shapes. That is, for example, the primary coils may be elliptical and the secondary coils may be circular. Further, helical coils may be utilized and the secondary coils may be formed of a heavier gauge wire than the wire gauge of the primary coils.

The coils may have constant canting or variable canting and the primary and secondary coils may be disposed in an alternating pattern along the centerline.

A garter spring may be formed by joining ends of the primary and secondary coils and the primary coils and secondary coils may be disposed with a concave turn-angle within the garter spring or a convex turn-angle. Both radial and axial springs may be utilized in accordance with the present invention.

BRIEF DESCRIPTION OF THE DRAWINGS

The advantages and teachers of the present invention will appear from the following description when considered in conjunction with the accompanying drawings in which:

FIGS. 1A–1G show radial or axial or turn-angle springs with elliptical coils canting along the minor axis and deflecting along the minor axis with offset coils on one side only, the coils may be spaced or abutted, with spaced coils being shown;

FIGS. 2A–2G show radial or axial or turn-angle springs with round coils canting radially, axially or at a turn-angle and deflecting in the same direction with offset radial, axial or offset coils on one side only, coils may be spaced or abutted, with spaced coils being shown;

FIGS. 3A–3G show radial, axial or turn-angle springs canting along the minor axis and deflecting along the major axis, with offset coils along the major axis on side only, the coil may be spaced or abutted, with spaced coils being shown;

FIGS. 4A–4G show radial, axial or turn-angle springs with round coils, canting radially, axially or at a turn-angle and offset axially (FIG. 4A), or radially (FIG. 4B) with offset coils along the major axis on one side only, coils may be spaced or abutted, with spaced coils being shown;

FIGS. 5A–5G show radial, axial or turn-angle springs with elliptical coils canting along the minor axis and deflecting along the minor axis with offset coils on both sides of the minor axis, coils have alternating points of contact, coils may be spaced or abutted, with spaced coils being shown;

FIGS. 6A–6G show radial, axial or turn-angle springs with round coils offset and canting radially (FIG. 6A), axially (FIG. 6B) and at a turn-angle (FIGS. 6C and 6D) and deflecting in the same direction, the springs being a repeating series of multiple coils (three shown), sides of the coils having alternating points of contact, coils may be spaced or abutted, with spaced coils being shown;

FIGS. 8A–8H show variable canting angle coils of a spring that can be elliptical or round and the spring can be radial, axial or turn-angle with or without alternating points of contact, springs may be combined with non-variable angle coils (FIGS. 8F, 8G, 8H), coils may be spaced or touching, with spaced coils shown in length and unloaded;

FIGS. 9A–9E show spring coils in line on one side of the coil and offset at top with the coils being singular, multiple with variable spacing of the coils and can be radial or axial with concave or convex angles and the canted-coils may either be elliptical or round, adjacent coils can be spaced or touching coils shown being shown spaced;

FIGS. 10A–10E show spring coils in line on one side of the coil and offset with the other side with the coils being singular, multiple with variable coils which can be spaced and canted or helical and can be radial or axial with concave or convex angles and the concave coils can be elliptical or round;

FIGS. 11A–11R show a plurality of spring coils in length with elliptical or round coils with alternating coils that can be radial, axial, angular, concave, convex and helical, concentric or eccentric with variable or alternating points of contact with variable coil spacings, variable wire diameters, adjacent coils may be spaced or touching, spaced coils being shown;

FIGS. 12A–12C show canted spring elliptical coils with a combination of radial, axial, concave and convex coils that form a length or ring, or garter, spring;

FIGS. 13A–13C show a canted spring with elliptical, eccentric offset centered coils with a combination radial, axial, and concave coils in length;

FIGS. 14A–14E show combinations of radial, axial, concave and convex turn-angles with elliptical coils canting along the minor axis, the spring being shown in length;

FIGS. 15A–15E show a combination of offset radial, axial, concave, convex turn-angle spring with elliptical coils offset on one side with canting along the minor axis, the spring being shown in length;

FIGS. 16A–16E show a combination of radial, axial, concave/convex turn-angles spring with round coils offset on one side with canting along the minor axis, spring being shown in the length;

FIGS. 17A–17E show various cross-sections of the coils, which may be utilized in accordance with the present invention;

FIG. 18 is a view of a radial "V" type spring with canting coils suitable for use in accordance with the present invention.

DETAILED DESCRIPTION

Figure 7A:
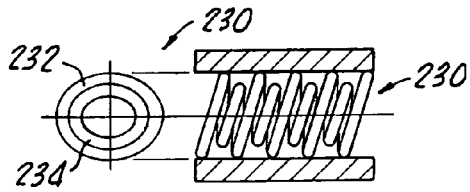
FIGS. 7A–7L show radial, axial or turn-angle springs with elliptical or round cross-section with the alternate coils that can be concentric or offset toward the top or bottom of the coil, coils may or may not be in line with the top or bottom.

With reference to FIG. 1A, there is shown a coil spring 10 in accordance with the present invention, including a plurality of primary coils 12, and a plurality of secondary coils 14. The spring 10 is radial with the elliptical coils 12, 14 offset along the minor axis 16 and canting along the minor axis is more clearly shown in FIG. 1E. It should be appreciated that the coils 12, 14 are contiguous and formed from any conventional wire suitable for the manufacture of springs.

A longitudinal sectional view of the spring 10 is shown in FIG. 1E with the offset elliptical coils canting along the minor axis with only one side of the coils having alternate points of contact 18, 20 with a loading member 22.

FIGS. 1E–1G show that the differential size of the coils 18, 20 provide variable force and variable deflection in that the deflection force will increase upon additional contact of the coils 12, 14 upon loading, see FIG. 1F, and further, upon deflection of the coils as shown in FIG. 1G.

With reference to FIG. 1E, there is shown an axial spring 30, having a plurality of primary coils 32 and secondary coils 34, which have an elliptical shape and are offset along a minor axis 36 and are canted along a minor axis.

With reference to FIG. 1C, there is shown a turn-angle spring 40 having primary coils 42 and secondary coils 44 of elliptical shape and offset along the minor axis 46, with one side only canting along the minor axis 46 and also with a concave turn-angle.

FIG. 1D shows a turn-angle spring 50 with elliptical primary and secondary coils 50 –54 offset along the minor axis 56 with only one side canting along the minor axis and the spring 50 having a convex turn-angle.

FIG. 2A shows a radial spring 60 with round primary and secondary coils, 62, 64 offset radially on one side and further canting radially as illustrated in FIG. 1E, which shows a longitudinal sectional view of the spring 60 with the coils 62, 64 having alternate points of contact with a loading member 70. As hereinabove described in connection with embodiment 10, this enables tailoring of the deflection forces of the spring as illustrated in FIGS. 2E–2G.

FIG. 2B shows an axial spring 72 having round primary and secondary coils 72–74 offset axial on one side and canting axial.

FIG. 2C shows a turn-angle spring 80 having round primary and secondary coils, 82, 84 offset angularly on one side only and canting along a concaved turn-angle;

With reference to FIG. 2D, there is shown turn-angle spring 90 with round primary and secondary coils, 92, 94 offset on one side only and canting along a convex turn-angle.

FIG. 3A shows a spring 100 having continuous elliptical primary and secondary coils, 102 and 104 offset axially on the one side deflecting along the major axis 106 and canting along a minor axis 108.

FIG. 3B shows an axial spring 110 with elliptical primary and secondary coils 112, 114 offset radially on one side and deflecting along the major axis 116 and canting along the minor axis 118.

Loading of the spring 110 is illustrated in FIGS. 3E–3G;

FIG. 3C illustrates a turn-angle spring 120 with elliptical primary and secondary coils, 122 and 124 offset angularly along a major axis 126 on one side only with a concaved angle deflecting along the major axis 126 and canting along the minor axis 128.

With reference to FIG. 3D, there is shown a turn-angle spring 130 with elliptical primary and secondary coils 132 and 134, offset angularly along the major axis 136 on one side only with a convex angle and deflecting along the major axis and canting along the minor axis 138.

FIG. 4A shows a radial spring 140 with round primary and secondary coils 142, 144 offset axially on one side and canting axially.

FIGS. 4E–4G illustrate loading of the spring 140 with the differentiation in primary and secondary coil size, providing variable force and variable deflection.

FIG. 4B shows an axial spring 150 with round primary and secondary coils 152, 154 offset radially on one side and canting radially.

FIG. 4C illustrates a turn-angle spring 160 with primary and secondary coils 162 and 164, which are offset angularly on one side and canting along a convex spring turned angle.

FIG. 4D shows a turn-angle spring 170, having round primary and secondary coils 172, 174 offset angularly on one side only and canting along a concave spring turn-angle.

FIG. 5A illustrates a radial spring 180 with elliptically offset radially primary and secondary coils 182, 184 with both sides canting along a minor axis 186.

FIGS. 5A–5G illustrate loading of the spring 180 by a loading member 188 with alternating points of contact, the spring being shown in an unloaded position in FIG. 5E.

FIG. 5B shows an axial spring 190 with elliptically offset axial primary and secondary coils 192, and 194 canting along a minor axis 196 on both sides.

FIG. 5C shows a turn-angle spring 200 with elliptical primary and secondary coils 202 and 204 offset angularly along a minor axis 206 with a concave spring angle.

FIG. 5D illustrates a turn-angle spring 210 having elliptical primary and secondary coils 212, 214 offset angularly minor axis 216 with a convex spring turn-angle.

FIGS. 6A–6G show radial axial turn-angle springs 220, 222, 224 and 226, similar to springs 180, 190 and 210 described in connection with FIGS. 5A–5E, except the deflection is occurring along a major axis of the elliptical coils.

FIG. 7A illustrates a coil spring 230 having radial elliptical primary and secondary coils 232, 234, which are concentric with variable coil dimensions.

Figure 7B:
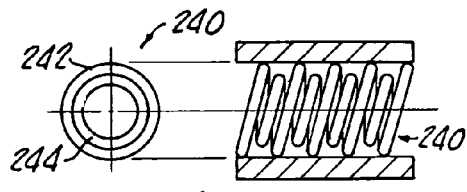

FIG. 7B illustrates a coil spring 240 having round primary and secondary coils 242, 244, which are concentric with variable coil diameter.

Figure 7C:
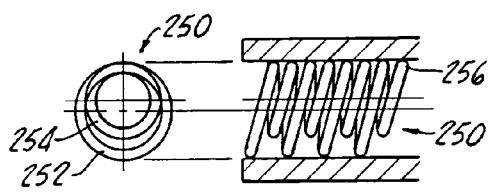

FIG. 7C illustrates coil spring 250 having round primary and secondary coils 252 and 254, eccentric to a top 256 of the coil 250.

Figure 7D:
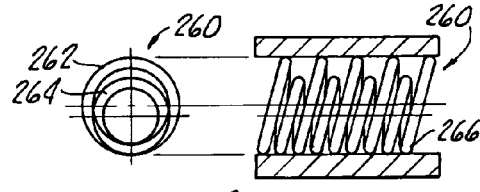

FIG. 7D shows a spring 260 having round primary and secondary coils 262, 264 offset toward a bottom 266 of the spring 268 with variable spring diameters.

Figure 7E:
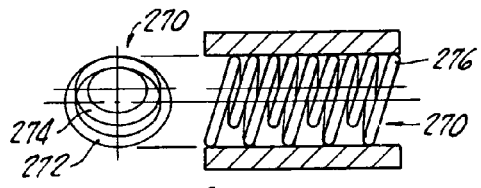

FIG. 7E shows a coil spring 270 having radial elliptical primary and secondary coils 272, 274 offset toward a top 276 of the spring 270 with variable elliptical coils.

Figure 7F:
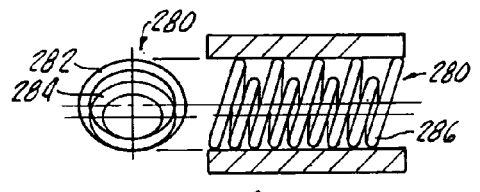

FIG. 7F shows a spring 280 having radial elliptical and secondary coils 282, 284 offset toward a bottom 286 of the spring 280 with variable elliptical coils.

Figure 7G:
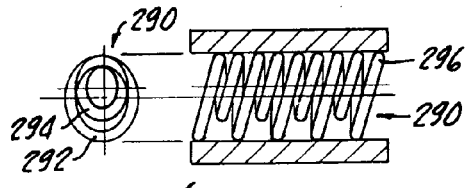

FIG. 7G shows a spring 290 having axial primary and secondary coils 294 offset toward a top 296 of the spring 290.

Figure 7H:
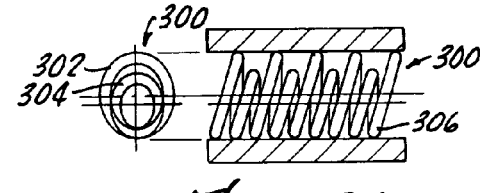

FIG. 7H shows a spring 300 having axial elliptical primary and secondary coils 302, 304 offset toward a bottom 306 with variable elliptical coils.

Figure 7I:
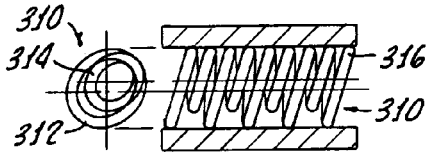

FIG. 7I shows an angular concave spring 310 having primary and secondary coils 312, 314 offset toward a top of the spring 210 with variable elliptical coils.

Figure 7J:
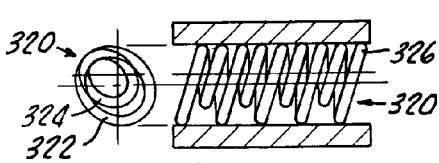

FIG. 7J shows an angular current axial elliptical spring 320 having primary and secondary coils 322, 324 offset toward a top 326 of the spring 320 with variable elliptical coils 322, 324.

Figure 7K:
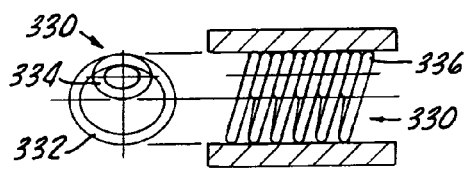

FIG. 7K shows a spring 330 having radial elliptical and primary and secondary coils 332, 334 offset on a top 336. It should be appreciated primary and secondary coils 332 and 334 may be elliptical or round or in combination. In addition, as shown in FIG. 330, the primary and secondary coils 332 and 334 in a butted relationship.

Figure 7L:
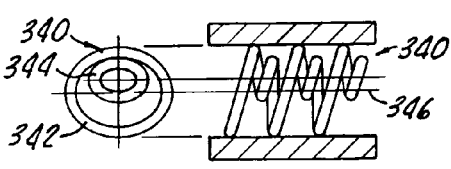

FIG. 7L shows a spring 340 having primary and secondary coils 342, 344, which are eccentrically disposed. That is, the secondary coils 334 are offset from a centerline 346, yet displaced from a primary coil 332.

FIG. 8A illustrates elliptical and round coils 352 forming a spring 354 with variable canting angles within angles A and B of the coil.

FIG. 8B shows springs 360, 362 having, respectively, primary and secondary elliptical coils 364 and 366 and round coils 368 and 370, which are eccentric and include variable canting angles.

FIG. 8C shows springs 376, 378 having respectively elliptical primary and secondary coils 380, 382 and round primary and secondary coils, 384, 386 with eccentric relationships and variable canting.

FIG. 8D shows springs 390, 392 with respectively primary and secondary elliptical coils 394, 396 and primary and secondary round coils 398, 400, concentrically arranged with a variable canting.

FIG. 8E shows springs 404, 406 having respectively elliptical primary and secondary coils 410 and primary and secondary round coils 412, 414 arranged concentrically.

FIG. 8F illustrates a singular or multiple spring 418, 420 having respectively elliptical primary and secondary coils 422, 424 or round primary, secondary coils 428 with a variable canting angle, which may be radial or axial, concave or convex.

FIG. 8G shows springs 432, 434 having respectively elliptical primary and secondary coils 436, 438 and primary and secondary round coils 440, 442 with variable canting.

As shown in FIG. 8A, a spring 446 may have primary and secondary coils 448, 450, which are eccentrically disposed with the secondary coils 450 being disposed in a spaced apart relationship with a spring centerline 452.

FIGS. 9A–9E show a spring 456 having a primary elliptical coil 458 and a smaller elliptical secondary coil 460 offset at a top of spring 456 as better shown in FIG. 9a. FIG. 9B shows the spring 456 unloaded deflecting only the primary coil 458.

FIG. 9C is a side view of the spring 456 in an unloaded position. FIG. 9d shows an alternative embodiment 466, utilizing round springs and shown in an unloaded position.

FIG. 9E shows the spring 456 with all the coils in a loaded position.

FIGS. 10A–10E shows springs 470–472 having respectively large primary coils 474 and small secondary coils 476 offset at a bottom 478 of the spring 470 in loaded and unloaded positions, as described in connection with the spring 456 in FIG. 9.

FIGS. 11A–11C show springs 480, 482 in length with the spring 480 having primary and secondary elliptical coils 482, 484 and the spring 482 having primary and secondary round coils 486 and 488 as shown all of the coils are in line at a bottom 490, 492 of each of the springs 480–482.

FIGS. 11A–11G similarly show springs 494, 496 with coils 498, 500, 502, 504 aligned at tops 506, 508 of the springs 494, 496.

FIG. 11G illustrates springs 510, 512 having a variable canted primary coils 514 and secondary coils 516 of a larger wire gauge or diameter.

FIGS. 11A–11J illustrate springs 520, 522 in length with a plurality of primary coils 524 and secondary coils 526.

FIGS. 11R–11M illustrate springs 520A, 522A in length with elliptical primary coils 524A coils with variable canting and circular secondary coils 526A offset toward a top of the spring.

FIGS. 11N–11P illustrate springs 520B, 522B in length with elliptical primary coils 524B with variable canting and circular secondary coils 526B offset toward a bottom of the spring.

FIG. 11A shows a spring 530 having primary canted-coils 532 and helical 534.

FIG. 11R is an illustration of a spring 538, having primary and secondary coils 540, 542 with the secondary coils being disposed in an eccentric relationship with the primary coils 540, the spring 548 being shown in the length.

FIG. 12A shows a garter-type spring 554 having radial primary coils 556 with axial secondary coils 558 disposed therein.

FIG. 12B shows a turn-angle spring 562 having primary radial coils 564 and secondary actual coils 566 with the spring 562 being concave.

FIG. 12C shows a turn-angle spring 570 having a primary radial coils 572 and secondary axial coils 574, a spring being in a convex position.

FIG. 12D includes a side view of the spring 554 showing the manner in which the coils are positioned in a longitudinal manner.

FIGS. 14A–14E illustrates springs 578, 580, 582, 584, 586 with various positionings of primary and secondary coils.

FIG. 14A shows a combination concave/convex turn-angle spring 590 having primary and second coils 592, 594 and FIGS. 14C–14E show various end views taken along the lines indicated in FIG. 14a.

FIG. 15A shows a combination of offset radial, axial concave turn-angle and convex turn-angle spring 600 having primary and secondary coils 602, 604 as indicated in FIG. 15A.

FIGS. 15B–15E are cross-sectional views taken along the lines as indicated in FIG. 15A.

FIGS. 16A–16E show the spring 610 having round primary and secondary coils 612 and 614. This should be compared with FIGS. 15A–15E in which spring 600 includes elliptical primary and secondary coils 602, 604, and a combination of radial and axial concave turn-angle and convex turn-angle.

FIGS. 16B–16E show cross-sections of the spring 610 taken along the lines as indicated in FIG. 16A.

FIGS. 17A–17E and FIG. 18 show various cross-sectional views of primary and secondary coils, which may be utilized in the hereinabove described configuration of springs.

Although there has been hereinabove described specific coil spring in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element, which is not specifically disclosed herein. Accordingly, any and all modifications, variations or equivalent arrangements, which may occur to those skilled in the art, should be considered to be within the scope of the present invention as defined in the appended claims.

What is claimed:

1. A coil spring comprising:
a plurality of non-overlapping primary canted round wire coils, each having a major and a minor axis and canted along a coil centerline defined by an intersection of the primary coil major and minor axis; and
a plurality of secondary canted round wire coils, having a major and a minor axis and canted along a coil centerline defined by an intersection of the second coil major and minor axis, the primary and secondary coils being offset from one another, contiguous and differentiated from one another by a dimensional size in order to provide variable force and variable deflection, said secondary wire coils being disposed between adjoining and contiguous primary wire coils, said primary and secondary coils being joined to form a garter spring and said primary and secondary coils being disposed with one of a concave turn angle and a convex turn angle within the gater spring.

2. The coil spring according to claim 1 wherein the secondary coils have a smaller diameter than a diameter of the primary coils.

3. The coil spring according to claim 2 wherein the primary and secondary coils are offset toward a bottom of the coil spring.

4. The coil spring according to claim 1 wherein the primary and secondary coils are offset toward a top of the coil spring.

5. The coil spring according to claim 1 wherein the primary and secondary coils are round.

6. The coil spring according to claim 1 wherein the primary coils are canted and secondary coils are helical.

7. The coil spring according to claim 1 wherein the secondary coils are of heavier gauge wire than a wire gauge of the primary coils.

8. The coil spring according to claim 1 wherein the primary coils are elliptical and the secondary coils are round.

9. The coil spring according to claim 1 wherein the primary and secondary coils are canted with variable canting.

10. The coil spring according to claim 1 wherein the primary and secondary coils are disposed in an alternating pattern along a centerline.

11. The coil spring according to claim 1 wherein the primary coil is radial and the secondary spring is axial.

12. The coil spring according to claim 1 wherein at least one of the primary and secondary coils has a D cross-section.

13. The coil spring according to claim 1 wherein at least one of the primary and secondary coils has a square cross-section.

14. The coil spring according to claim 1 wherein at least one of the primary and secondary coils has a rectangular cross-section.

15. The coil spring according to claim 1 wherein at least one of the primary and secondary coils has a triangular cross-section.

16. The coil spring according to claim 1 wherein at least one of the primary and secondary coils have a cross-section with flat sides.

17. The coil spring according to claim 1 wherein at least one of the primary and secondary coils is V shaped.

18. A coil spring comprising:
a plurality of non-overlapping primary canted round wire coils, each having a major and a minor axis and canted along a coil centerline defined by an intersection of the primary coil major and minor axis; and
a plurality of secondary canted round wire coils, having a major and a minor axis and canted along a coil centerline defined by an intersection of the second coil major and minor axis, the primary and secondary coils being disposed in an eccentric manner about a spring centerline in order to provide variable force and variable deflection, said secondary wire coils being disposed between adjoining and contiguous primary wire coils, said primary and secondary coils being offset toward one of a bottom and a top of the coil spring, said primary and secondary coils being joined to form a garter spring and said primary and secondary coils being disposed with one of a concave turn angle and a convex turn angle.

19. The coil spring according to claim 18 wherein the secondary coils have a smaller diameter than a diameter of the primary coils.

20. The coil spring according to claim 18 wherein the primary and secondary coils are elliptic and offset toward a bottom of the coil spring.

21. The coil spring according to claim 18 wherein the primary coils and secondary coils are offset toward a top of the coil spring.

22. The coil spring according to claim 18 wherein the primary coils are canted and the secondary coils are helical.

23. The coil spring according to claim 18 wherein the secondary coils are of heavier gauge wire than a wire gauge of the primary coils.

24. The coil spring according to claim 18 wherein the primary coils are elliptical and the secondary coils are round.

25. The coil spring according to claim 18 wherein the primary and secondary coils are canted with variable canting.

26. The coil spring according to claim 18 wherein the primary and secondary coils are disposed in an alternating pattern along a centerline.

27. The coil spring according to claim 18 wherein the primary coil is radial and the secondary spring is axial.

28. The coil spring according to claim 18 wherein at least one of the primary and secondary coils has a D cross-section.

29. The coil spring according to claim 18 wherein at least one of the primary and secondary coils has a square cross-section.

30. The coil spring according to claim 18 wherein at least one of the primary and secondary coils has a rectangular cross-section.

31. The coil spring according to claim 18 wherein at least one of the primary and secondary coils has a triangular cross-section.

32. The coil spring according to claim 18 wherein at least one of the primary and secondary coils has a cross-section with flat sides.

* * * * *